Patented May 5, 1925.

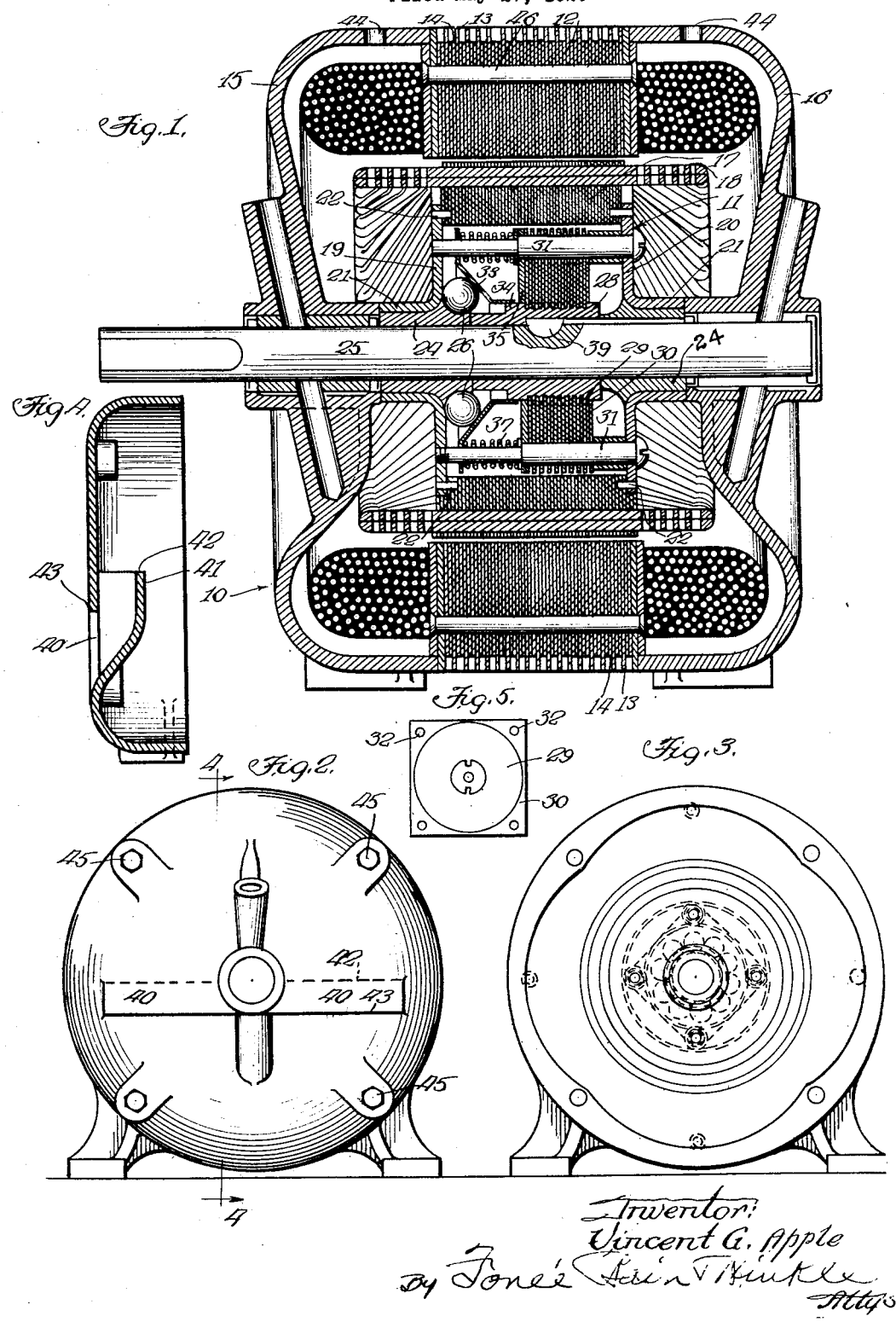

1,536,279

UNITED STATES PATENT OFFICE.

VINCENT G. APPLE, OF DAYTON, OHIO.

DYNAMO-ELECTRIC MACHINE.

Application filed May 27, 1920. Serial No. 384,574.

*To all whom it may concern:*

Be it known that I, VINCENT G. APPLE, a citizen of the United States, residing at Dayton, in the county of Montgomery and State of Ohio, have invented certain new and useful Improvements in Dynamo-Electric Machines, of which the following is a specification.

This invention relates to improvements in dynamo electric machines, and has especial reference to alternating current motors.

One of the objects of the invention is to provide a rotor, of such machines, freely rotatable on its axis independently of the load, and improved means, responsive to the speed thereof, to automatically connect it to its load when its predetermined speed is reached.

Another and more specific object is to provide a hollow rotor and locate the speed-responsive connecting means therein to economize space.

Another object is to provide a simple, durable, automatic and efficient connecting means, sensitive in operation, so that it will perform its intended functions within a very small range of speed variation or at a very critical speed and which provides a frictional connection, having large frictional surfaces, sufficiently positive for all operative purposes but yieldable to a safe extent by sudden application of overload.

Another object is a means for increasing the heat radiating surfaces.

Another object is to provide a self-contained rotor and speed-responsive-connecting-means that will not become disarranged when the rotating structure is removed from the field, or stator.

Another object is to improve the means of ventilation to disperse heat that may be engendered in the electro-magnetically active parts of the device.

Other, further and more specific objects of the invention will become readily apparent from a consideration of the following description when taken in conjunction with the drawings, wherein:—

Fig. 1 is a central section of the motor.

Fig. 2 is an end view.

Fig. 3 is an end view with one of the end plates or heads removed.

Fig. 4 is a section through an end plate taken on line 4—4 of Fig. 2.

Fig. 5 is a detail view of two of the disks constituting parts of the clutch mechanism.

In all the views the same reference characters are employed to indicate similar parts.

In the drawings 10 is the stator, and 11 is a rotor of the dynamo-electric-machine. The stator has a laminated field 12, composed of rings 13 of sheet iron, and alternate rings 14. The rings 13 are of larger diameter to project beyond the peripheral edges of the rings 14 for the purpose of providing air spaces for larger heat radiating surfaces to disperse the heat that may be engendered by the magnetic changes in the core. 15 is one head of the structure and 16 is the other.

The rotor 11 is provided with a laminated core 17 and windings 18 in the usual form. The rotor also has end plates 19 and 20, each having a hub 21. The laminations 17, of the rotor, are preferably, cemented together by a phenolic condensation product so that the core 17 is substantially self supporting. Driving pins 22 are passed through the heads 19 and 20 into the laminations 17, so as to rotatably secure the parts 19 and 20 to the core. The sleeves 21 of the rotor are connected to bearing sleeves 24 that are rotatable on the shaft 25. The inner ends of the sleeves are hardened to provide bearings for the balls 26. A series of clutch disks 29 are mounted on a hub 28 and are rotatable therewith. The discs 29 are round in form and alternate with discs 30, that are, preferably, rectangular in form as more clearly shown in Fig. 5. Bolts 31 pass through the heads 19 and 20 and thru the square discs 30, thru holes 32 in their respective corners of the discs 30, there being four bolts disposed as shown in Fig. 3. The hollow cone-shaped member, 33 having a hub portion 34, is slidable on the hub 28, and its inner edge bears against a disc 35 so, that when the cone member 33 is forcibly moved toward the right of Fig. 1, the discs 29 and 30 will be brought into forcible driving contact. The discs 29 and 30 are mounted on the hub 28 and the bolts 31, respectively. The balls 26 are in contact with the inner surface of the head 19 and the inclined surface of the cone.

Now, it will be manifest that when a critical speed is reached, the balls 26 will fly outwardly on the inside edge of the cone portion 33 and thereby press the discs together against the resilient effect of the springs 37. The centrifugal effect of the balls is sufficient to some extent to overcome the effect of the springs 37, which are coiled around each of the bolts 31, at the time when the critical speed is reached.

At the time of starting the motor, the rotor 11 alone is rotatable, it being then disconnected from the shaft and rotating upon the hubs 21 and 24. When the critical speed is reached, the balls 26 fly outwardly and force the friction discs 29 and 30 together so that then the rotor will be connected to shaft 25, as the hub 28 is connected thereto by means of the key 39.

The end plates or heads are each provided with an opening 40 and an inner shield portion 41. The edge 42 of the latter extends above the edge 43, as more clearly shown in Figs. 2 and 4. The rotation of the member 11 draws air in through the opening 40 and causes it to circulate in and around the magnetically active and electric conducting portions from whence it may escape by the openings 44 that may be made in the outer rim of the heads. Bolts 45 pass thru the heads 15 and 16 and thru the laminations 12. Instead of using the headed rods 46, the laminations 12 may be cemented together in the manner heretofore described.

Having described my invention what I claim as new and desire to secure by Letters Patent is:—

A device of the character described comprising a rotatable shaft; a pair of spaced disks rotatable thereon; a ring connected near the periphery of the disks to provide a substantially closed housing to prevent entrance of foreign matter therein; a pair of pins passing thru the disks and substantially parallel with the shaft: a series of axially movable flat rings supported on the pins; a series of axially movable flat rings rotatable with the shaft and alternating in position with the flat rings on the pins and centrifugally operable means within the closed housing to press said flat rings together to rotatably connect the housing and the shaft.

In testimony whereof I hereunto subscribe my name.

VINCENT G. APPLE.